(12) United States Patent
Lin et al.

(10) Patent No.: US 9,587,765 B2
(45) Date of Patent: Mar. 7, 2017

(54) SOUND TREATMENT ASSEMBLY FOR A FLUID TRANSMISSION LINE

(71) Applicant: EMERSON PROCESS MANAGEMENT REGULATOR TECHNOLOGIES, INC., McKinney, TX (US)

(72) Inventors: Chun Lin, McKinney, TX (US); Robert J. Watson, Dallas, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/692,544

(22) Filed: Apr. 21, 2015

(65) Prior Publication Data
US 2015/0300525 A1 Oct. 22, 2015

Related U.S. Application Data

(60) Provisional application No. 61/982,721, filed on Apr. 22, 2014.

(51) Int. Cl.
| | | |
|---|---|---|
| *F01N 1/24* | (2006.01) | |
| *F16K 47/08* | (2006.01) | |
| *F16L 55/033* | (2006.01) | |

(52) U.S. Cl.
CPC ............ *F16K 47/08* (2013.01); *F16L 55/033* (2013.01)

(58) Field of Classification Search
CPC ...................................................... F01N 1/082
USPC ........................................................ 181/258
See application file for complete search history.

(56) References Cited

U.S. PATENT DOCUMENTS

| | | | |
|---|---|---|---|
| 3,731,903 A | | 5/1973 | Webb et al. |
| 5,007,499 A | * | 4/1991 | Ebbing et al. ................ 181/258 |
| 5,145,026 A | * | 9/1992 | Wilder .......................... 181/233 |
| 5,767,459 A | * | 6/1998 | Sell .............................. 181/258 |
| 6,343,672 B1 | | 2/2002 | Petela et al. |

(Continued)

FOREIGN PATENT DOCUMENTS

| | | |
|---|---|---|
| DE | 2159963 A1 | 6/1972 |
| GB | 471431 A | 9/1937 |
| JP | S6165979 A | 4/1986 |

OTHER PUBLICATIONS

International Search Report and Written Opinion for Application No. PCT/US2015/026988, dated Jul. 22, 2015.

*Primary Examiner* — Forrest M Phillips
(74) *Attorney, Agent, or Firm* — Marshall, Gerstein & Borun LLP

(57) ABSTRACT

A sound treatment assembly includes an outlet member having a bore extending along a longitudinal axis, and a first flange portion is adapted to be coupled to portion of a valve body of a regulator valve. The first flange portion includes a contoured mating surface adapted to mate with a corresponding contoured portion of an exterior surface of the valve body. The outlet member also includes a second flange portion disposed at the second end. A diffuser assembly includes diffuser housing extending along the longitudinal axis, and a first flange portion is disposed at the first end of the diffuser housing and is adjacent to the second flange portion of the outlet member. One or more diffuser elements are disposed within an interior of the diffuser housing to reduce noise levels in the fluid exiting the outlet member.

14 Claims, 4 Drawing Sheets

(56) References Cited

U.S. PATENT DOCUMENTS 7,325,474 B2 * 2/2008 Yoshimura et al. ........... 89/14.4
2014/0069737 A1 3/2014 May et al.

* cited by examiner

SOUND TREATMENT ASSEMBLY FOR A FLUID TRANSMISSION LINE

FIELD OF THE DISCLOSURE

This disclosure relates generally to valves, and more particularly, to a sound treatment assembly for valves.

BACKGROUND

Pressure regulator valves can be used to decrease pressure in a fluid transmission line system. Typically, the pressure regulator valves include a valve housing and these valve housings often have exterior surfaces or portion of exterior surfaces that are contoured with complex curvature (e.g., curves having more than one radius of curvature). For example, the known pressure regulator valve 10 of FIG. 1 includes a valve housing 12 such a contoured exterior surface 14. A separate outlet member 16 may be secured to a portion of the valve housing 12 such that a first end flange 18 has a mating surface that is machined to correspond to the shape of the contoured exterior surface 14, as illustrated in FIG. 1. The outlet member 16 has a second end flange 20 adapted to be coupled to a portion of the transmission line (not shown), and fluid flows from through the interior of the outlet member 16 from a valve control element (not shown) disposed within the valve housing 12 to the transmission line.

In some applications, the pressure regulator valve 10 may generate a great deal of noise as fluid expands within the outlet member 16. Accordingly, a sound treatment device 22 may be employed to attenuate the noise level, as illustrated in FIG. 2. Typically, the outlet member 16 is removed by the end-user and the sound treatment device 22 is secured to the valve housing 12. The sound treatment device 22 may include a housing 24 and a plurality of sound reducing elements disposed within an interior of the housing 24. For example, the plurality of sound reducing elements may include a plurality of springs 26 disposed within a retaining element and/or one or more perforated sounds plates 28 disposed normal to the direction of fluid flow. As known in the art, such sound reducing elements gradually reduce pressure in the fluid to reduce noise. Because the sound treatment device 22 engages the valve housing 12 in the same manner as the outlet member 16, a first end flange 30 has a mating surface that is machined to correspond to the shape of the contoured exterior surface 14. So configured, the contoured mating surface of the first end flange 30 of the sound treatment device 22 is difficult and expensive to machine. Because the outlet member 16 is replaced with the sound treatment device 22, the outlet member 16 is discarded, thereby inefficiently wasting a precisely machined part.

BRIEF SUMMARY OF THE DISCLOSURE

A sound treatment assembly for use in a fluid transmission line includes an outlet member extending along a longitudinal axis from an open first end to a longitudinally opposite open second end. An outlet bore extends from the first end to the second end. The outlet member has a first flange portion disposed at the first end, and the first flange portion is adapted to be coupled to portion of a valve body of a regulator valve. The first flange portion includes a contoured mating surface adapted to mate with a corresponding contoured portion of an exterior surface of the valve body. The outlet member also includes a second flange portion disposed at the second end. The sound treatment assembly also includes a diffuser assembly having a diffuser housing extending along a longitudinal axis from an open first end to a longitudinally opposite open second end. A bore extends from the first end to the second end, and the bore includes a first portion that extends from a first end to a second end. The first portion diverges from the first end to the second end. A first flange portion is disposed at the first end of the diffuser housing, and the first flange portion is disposed adjacent to the second flange portion of the outlet member. A second flange portion is disposed at the second end of the diffuser housing, and the second flange portion is adapted to be coupled to portion of a downstream pipe. The diffuser assembly also includes one or more diffuser elements disposed within the bore.

DETAILED DESCRIPTION

Figure 3:
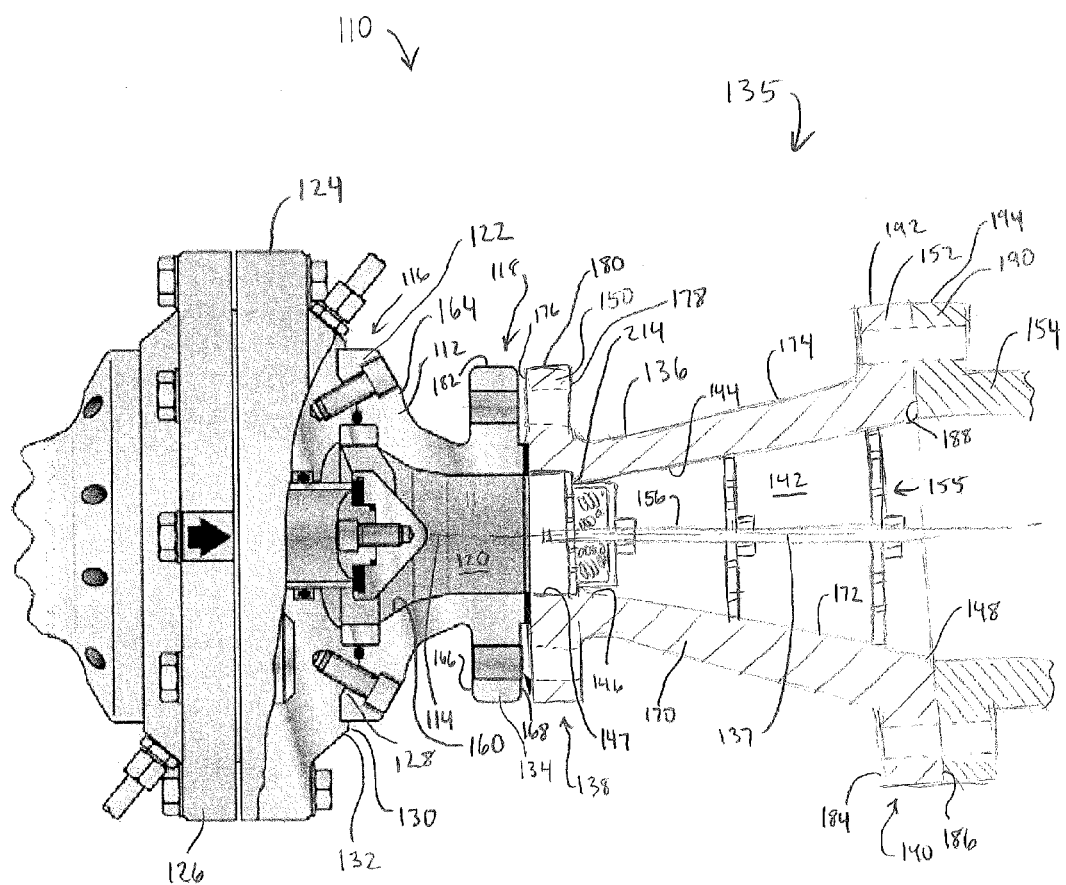
FIG. 3 is a partial cross-sectional view of an embodiment of a pressure regulator having the sound treatment assembly secured thereto.

As illustrated in FIG. 3, a sound treatment assembly 110 for use in a fluid transmission line includes an outlet member 112 extending along a longitudinal axis 114 from an open first end 116 to a longitudinally opposite open second end 118. An outlet bore 120 extends from the first end 116 to the second end 118. The outlet member 112 has a first flange portion 122 disposed at the first end 116, and the first flange portion 122 is adapted to be coupled to portion of a valve body 124 of a regulator valve 126. The first flange portion 122 includes a contoured mating surface 128 adapted to mate with a corresponding contoured portion 130 of an exterior surface 132 of the valve body 124. The outlet member 112 also includes a second flange portion 134 disposed at the second end 118.

Still referring to FIG. 3, the sound treatment assembly 110 includes a diffuser assembly 135 including a diffuser housing 136 extending along a longitudinal axis 137 from an open first end 138 to a longitudinally opposite open second end 140. A bore 142 extends from the first end 138 to the second end 140, and the bore 142 includes a first portion 144 that extends from a first end 146 to a second end 148. The first portion 144 diverges from the first end 146 to the second end 148. A first flange portion 150 is disposed at the first end 138 of the diffuser housing 136, and the first flange portion 150 is disposed adjacent to the second flange portion 134 of the outlet member 112. A second flange portion 152 is disposed at the second end 140 of the diffuser housing 136, and the second flange portion 152 is adapted to be coupled to portion of a downstream pipe 154 (i.e., a portion of a fluid transmission line). One or more diffuser elements 155 are disposed within the bore 142.

Configured as described, the diffuser assembly 135 may be secured by a field technician to a flange of an existing outlet member 112. Because the existing outlet member 112 is used, there is no need to provide a first flange portion 150 on the diffuser assembly 135 that has a contoured mating surface that is machined to correspond to the contoured exterior surface of the valve body 124, thereby reducing manufacturing complexity and production costs of the sound treatment assembly 110. Instead, a conventional flange portion 150 of the diffuser assembly 135 is coupled to a conventional second flange portion 134 of the outlet member 112. By utilizing—and not replacing—the existing outlet member 112, waste is reduced and the assembly process is simplified.

Turning to the sound treatment assembly 110 in more detail, the outlet member 112 extends along the longitudinal axis 114 from the open first end 116 to the longitudinally opposite open second end 118. The outlet member 112 may include a body portion 160 having an interior bore surface 162 that defines the outlet bore 120 that extends from the first end 116 to the second end 118 of the outlet member 112. The outlet bore 120 may have a circular cross-sectional shape when viewed along the longitudinal axis 114, and all or a portion of the outlet bore 120 may converge from the from the first end 116 to the second end 118 of the outlet member 112.

The outlet member 112 may have a first flange portion 122 disposed at the first end 116, and the first flange portion 122 may be adapted to be coupled to portion of a valve body 124 of a regulator valve 126. For example, one or more bolts (not shown) may extend through corresponding apertures disposed through the first flange portion 122, and a lower portion of the one or more bolts may be received into threaded apertures to secure the first flange portion 122 to the valve body 124. The first flange portion 122 may be annular and may extend radially away from an exterior surface 164 of the body portion 160. The first flange portion 122 may be substantially planar or may be non-planar. The first flange portion 122 includes the contoured mating surface 128 adapted to mate with a corresponding contoured portion 130 of an exterior surface 132 of the valve body 124. Each of the contoured mating surface 128 and the contoured portion 130 of an exterior surface 132 of the valve body 124 may be non-planar, but may have any shape or combination of shapes. For example, the contoured mating surface 128 and the contoured portion 130 of the exterior surface 132 of the valve body 124 may include a partially spherical surface, a partially conical surface, and/or a surface having more than one radius of curvature. The contoured mating surface 128 may be concave or substantially concave and the contoured portion 130 of the exterior surface 132 of the valve body 124 may be convex or substantially convex. The contoured mating surface 128 may contact the contoured portion 130 of the exterior surface 132 of the valve body 124 or may be adjacent to the contoured portion 130 of the exterior surface 132 of the valve body 124. In some embodiments, a gasket or other seal (not shown) may be disposed between the contoured mating surface 128 and the contoured portion 130 of the exterior surface 132 of the valve body 124.

The outlet member 112 may also include the second flange portion 134 disposed at the second end 118 of the outlet member 112. The second flange portion 134 may be annular and may extend radially away from the exterior surface 164 of the body portion 160 in a direction that is normal or substantially normal to the longitudinal axis 114. More specifically, the second flange portion 134 may be substantially planar and may have a planar first surface 166 and planar second surface 168 that are each substantially normal to the longitudinal axis 114. The second flange portion 134 may be adapted to be coupled to the first flange portion 150 of the diffuser housing 136. For example, a bolt (not shown) may extend through each of a plurality of apertures disposed through second flange portion 134 and the first flange portion 150 of the diffuser housing 136, and each bolt may be secured by one or more nuts in a conventional manner.

Still referring to FIG. 3, the sound treatment assembly 110 also includes the diffuser assembly 135 that includes the diffuser housing 136 extending along the longitudinal axis 137 from the open first end 138 to the longitudinally opposite open second end 140. The longitudinal axis 137 of the diffuser housing 136 may be coaxially-aligned with the longitudinal axis 114 of the outlet member 112. The diffuser housing 136 may include a body portion 170 having an interior bore surface 172 that defines the bore 142 that extends from the first end 138 to the second end 140 of the diffuser housing 136. The bore 142 may have any suitable shape or combination of shapes. For example, the bore 142 may have a circular cross-sectional shape when viewed along the longitudinal axis 137, and all or a portion of the outlet bore 120 may converge from the from the first end 138 to the second end 140 of the diffuser housing 136. More specifically, the bore 142 may include the first portion 144 that extends from a first end 146 to a second end 148 that may be at or adjacent to the second end 140 of the diffuser housing 136, and the first portion 144 diverges from the first end 146 to the second end 148 of the first portion. The bore 142 may further include a second portion 147 that extends from the first end 146 of the first portion 144 to the first end 138 of the diffuser housing 138. The second portion 147 may have any suitable shape or combination of shapes. For example, the second portion 147 may have a circular cross-sectional shape when viewed along the longitudinal axis 137. More specifically, the second portion 147 may have a constant cross-sectional shape such that a portion of the interior bore surface 172 corresponding to the second portion 147 has a cylindrical shape. The longitudinal length of the second portion 147 may be 5% to 25% of the longitudinal length of the first portion 144.

The diffuser assembly 135 may also include the first flange portion 150 disposed at the first end 138 of the diffuser housing 136. The first flange portion 150 may be annular and may extend radially away from an exterior surface 174 of the body portion 170 in a direction that is normal or substantially normal to the longitudinal axis 137. More specifically, the first flange portion 150 may be substantially planar and may have a planar first surface 176 and planar second surface 178 that are each substantially normal to the longitudinal axis 137. As previously explained, the first flange portion 150 may be adapted to be coupled to the second flange portion 134 of the outlet member 112, and the first surface 176 of the first flange portion 150 may be in contact with or adjacent to the second surface 168 of the second flange portion 134 of the outlet member 112. A gasket (not shown) may be disposed between the first flange portion 150 and the second flange portion 134 of the outlet member 112. So secured, a circumferential outer wall 180 of the first flange portion 150 may extend longitudinally from an end portion of the first surface 176 to an end portion of the second surface 178. The outer wall 180 may be coextensive with a circumferential outer wall 182 of the second flange portion 134 of the outlet member 112.

The diffuser assembly 135 may also include the second flange portion 152 disposed at the second end 140 of the diffuser housing 136. The second flange portion 152 may be annular and may extend radially away from the exterior surface 174 of the body portion 170 in a direction that is normal or substantially normal to the longitudinal axis 137. More specifically, the second flange portion 152 may be substantially planar and may have a planar first surface 184 and planar second surface 186 that are each substantially normal to the longitudinal axis 137. The second flange portion 152 may be adapted to be coupled to a portion of a downstream pipe 154. More specifically, the second surface 186 of the second flange portion 152 may be in contact with or adjacent to an outer surface 188 of a flange portion 190 of the downstream pipe 154. A gasket (not shown) may be disposed between the second flange portion 152 and the flange portion 190 of the downstream pipe 154. The second flange portion 152 may be adapted to be coupled to the flange portion 190 of the downstream pipe 154. For example, a bolt (not shown) may extend through each of a plurality of apertures disposed through second flange portion 152 and the flange portion 190 of the downstream pipe 154, and each bolt may be secured by one or more nuts in a conventional manner. So secured, a circumferential outer wall 192 of the second flange portion 152 may extend longitudinally from an end portion of the first surface 184 to an end portion of the second surface 186. The outer wall 192 may be coextensive with a circumferential outer wall 194 of the flange portion 190 of the downstream pipe 154.

Figure 4:
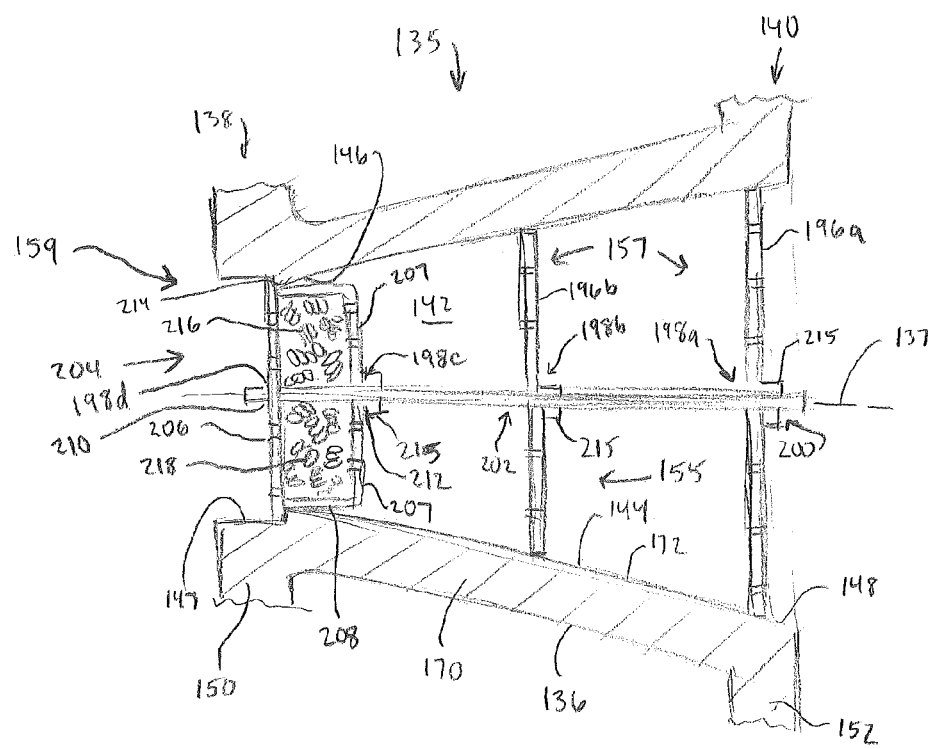
FIG. 4 is a partial cross-sectional view of an embodiment of a diffuser assembly of the sound treatment assembly.

Referring to FIG. 4, the diffuser assembly 135 also includes one or more diffuser elements 155 disposed within the bore 142. The one or more diffuser elements 155 may include any suitable sound diffusing element known in the art. For example, the one or more diffuser elements 155 may include one or more first diffuser elements 157 and one or more second diffuser elements 159 that are different from the one or more first diffuser element 157. The one or more first diffuser elements 157 may include a first sound plate 196a having a plurality of perforations (e.g., slots, holes, apertures), and the first sound plate 196a may be planar and may be disposed normal to the longitudinal axis 137 of the diffuser housing 136. The first sound plate may be disposed at a first longitudinal position 200 along the longitudinal axis 137. The first sound plate 196a may have a perimeter edge that is shaped to correspond to the shape of the bore 142 at the first longitudinal position 200. For example, if the bore 142 has a circular cross-section, the perimeter edge of the first sound plate 196a may have a circular shape. The diameter of the perimeter edge may be equal to or slightly less than the diameter of the bore 142 at the first longitudinal position 200. More specifically, the diameter of the perimeter edge may have a value that is between 100% and 90% of the value of the diameter of the bore 142 at the first longitudinal position 200. Thus, the perimeter edge of the first sound plate 196a may engage or be immediately adjacent to a portion of an interior bore surface 172 defining the bore 142. The first sound plate 196a (i.e., the first longitudinal position 200) may be disposed at or adjacent to the second end 148 of the first portion 144 and/or the second end 140 of the diffuser housing 136.

The one or more first diffuser elements 157 may also include a second sound plate 196b that may be similar or identical to the first sound plate 196a. Specifically, the second sound plate 196b may have a plurality of perforations, and the second sound plate 196b may be planar and may be disposed normal to the longitudinal axis 137 of the diffuser housing 136. The first sound plate may be disposed at a second longitudinal position 202 along the longitudinal axis 137 that is longitudinally-offset from the first longitudinal position 200. The second sound plate 196b may have a perimeter edge that is shaped to correspond to the shape of the bore 142 at the second longitudinal position 202. For example, if the bore 142 has a circular cross-section, the perimeter edge of the second sound plate 196b may have a circular shape. The diameter of the perimeter edge may be equal to or slightly less than the diameter of the bore 142 at the second longitudinal position 202. More specifically, the diameter of the perimeter edge may have a value that is between 100% and 90% of the value of the diameter of the bore 142 at the second longitudinal position 202. Thus, the perimeter edge of the second sound plate 196b may engage or be immediately adjacent to a portion of an interior bore surface 172 defining the bore 142. Accordingly, the diameter of the of the perimeter edge of the second sound plate 196b may be less than the diameter of the of the perimeter edge of the first sound plate 196a. The second sound plate 196b may be disposed between the first end 138 of the diffuser housing 136 and the first sound plate 196a.

The one or more first diffuser elements 157 may be secured in any suitable manner within the bore 142. For example, the one or more first diffuser elements 157 may be secured or coupled to a diffuser stem 156 that is at least partially disposed within the bore 142. The diffuser stem 156 may extend along the longitudinal axis 137 from a point at or adjacent to the first end 146 of the first portion 144 of the bore 142 to a point at or adjacent to the second end 148 of the first portion 144 of the bore 142. The diffuser stem 156 may or may not be secured to one or more valve components or surfaces. The first sound plate 196a may be coupled to a first portion 198a of the diffuser stem 156 (corresponding to the first longitudinal position 200 of the longitudinal axis 137) and second sound plate 196b may be coupled to a second portion 198b of the diffuser stem 156 (corresponding to the second longitudinal position 202 of the longitudinal axis 137) that is longitudinally spaced from the first portion 198a. The first sound plate 196a and the second sound plate 196b may each have an aperture disposed at the center thereof, and the aperture may be sized to receive the first portion 198a and second portion 198b, respectively, of the diffuser stem 156. The diffuser stem 156 may be threaded or partially threaded such that a nut 215 may threadedly engage the diffuser stem 156 and may be disposed adjacent to or in contact with each of the first sound plate 196a and the second sound plate 196b. While contact with the interior bore surface 172 prevents longitudinal displacement of the first sound plate 196a and the second sound plate 196b towards the first end 146 of the first portion 144 of the bore 142, one or more nuts 215 may be positioned to prevent longitudinal displacement of the first sound plate 196a and the second sound plate 196b towards the second end 148 of the first portion 144 of the bore 142 (or towards or outside of the second end 140 of the diffuser housing 136).

As illustrated in FIG. 4, the one or more diffuser elements 155 may include one or more second diffuser elements 159 that are different from the one or more first diffuser element 157, and the one or more second diffuser elements 159 may be disposed at any suitable location within the bore 142. The one or more second diffuser elements 159 may include any type of diffuser that is adapted to reduce noise in the fluid flowing through the bore 142 of the diffuser housing 144. For example, the one or more second diffuser elements 159 may include a retainer assembly 200 disposed at or adjacent to the first end 146 of the first portion 144 of the bore 142 and/or the first end 138 of the diffuser housing 136. The retainer assembly 204 may include a planar first end wall 206, a planar second end wall 207 longitudinally-offset from the first end wall 206, and a cylindrical outer wall 208 disposed between the first end wall 206 and the second end wall 207. Each of the first end wall 206 and the second end wall may be normal to the longitudinal axis 137 and each may have a plurality of perforations. The outer wall 208 may be integrally formed with either of the first end wall 206 or the second end wall 207, or the outer wall 208, the first end wall 206, and the second end wall 207 may be an assembly of separate components. The first end wall 206 may be disposed at a third longitudinal position 210 and the second end wall 207 may be disposed at a fourth longitudinal position 212.

The first end wall 206 and the second end wall 207 may have a perimeter edge having any suitable shape to correspond to the cross-sectional shape of the bore 142 at the third longitudinal position 210 and the fourth longitudinal position 212, respectively. For example, if the bore 142 has a circular cross-sectional shape, the first end wall 206 and the second end wall 207 may each have a perimeter edge having a circular shape. The outer wall 208 may have a cylindrical shape having an outside diameter equal to or approximately equal to the diameter of one or both of the perimeter edge of the first end wall 206 and the second end wall 207. The diameter of the first end wall 206 may be slightly larger than the outer diameter of the outer wall and the diameter of the second end wall 207, and a portion of the first end wall 206 inward of the perimeter edge may be adapted to engage a lip 214 disposed at or adjacent to the first end 146 of the first portion 144 of the bore 142. An outer diameter of the lip 214 may be slightly larger than the outer diameter of the outer wall 208, and a top portion of the lip 214 may be adjacent to or in contact with the outer diameter of the outer wall 208. The outer wall 208, and/or the first end wall 206 and/or the second end wall 207 may be secured together by any means known in the art (e.g., by welding or mechanical fastening).

The first end wall 206 and the second end wall 207 may each have an aperture disposed at the center thereof, and the aperture may be sized to receive a third portion 198c and a fourth portion 198d, respectively, of the diffuser stem 156. The diffuser stem 156 may be threaded or partially threaded at the third portion 198c and the fourth portion 198d such that a nut 215 may threadedly engage the diffuser stem 156 and may be disposed adjacent to or in contact with one or both of the first end wall 206 and the second end wall 207. Alternatively, one or both of the first end wall 206 and the second end wall 207 may be fixed to a portion of the diffuser stem 156 (e.g., a fifth end portion). Contact between the nut 215 and the second end wall 207 prevents displacement of the second end wall 207 (and the first end wall 206 and/or the outer wall 208) towards the second end 148 of the first portion 144 of the bore 142. As previously explained, contact with the interior bore surface 172 and the nut 215 prevents longitudinal displacement of the first sound plate 196a (and the second sound plate 196b and the diffuser stem 156), and contact between the lip 214 and the portion of the first end wall 206 inward of the perimeter edge may limit longitudinal displacement of the retainer assembly 204 that is coupled to the diffuser stem 156.

Still referring to FIG. 4, the first end wall 206, the second end wall 207, and the outer wall 208 may cooperate to define a retainer interior 216. A diffusing material 218 may be disposed in the retainer interior 215. The diffusing material 218 may include any suitable material, material, or combination of materials adapted to reduce or eliminate sound in fluid flowing through the material, material, or combination of materials. For example, the diffusing material 218 may include a plurality of relatively small springs and/or relatively small nuts and/or bolts.

Configured as described, the diffuser assembly 135 of the sound treatment assembly 110 of the present disclosure may be secured by a field technician to a flange of an existing outlet member 112 without removing and replacing the outlet member 112, as was necessary in prior art diffuser housings. Both material and manufacturing waste is therefore reduced, and the assembly of the diffuser assembly 135 to an existing regulator valve 126 is simplified. Moreover, as previously explained, the use of the existing outlet member 112 eliminates the need to provide a first flange portion 150 of the diffuser assembly 135 that has a contoured mating surface that is machined to correspond to the contoured exterior surface of the valve body 124. Manufacturing complexity and production costs of the sound treatment assembly 110 is therefore reduced.

Figure 5:
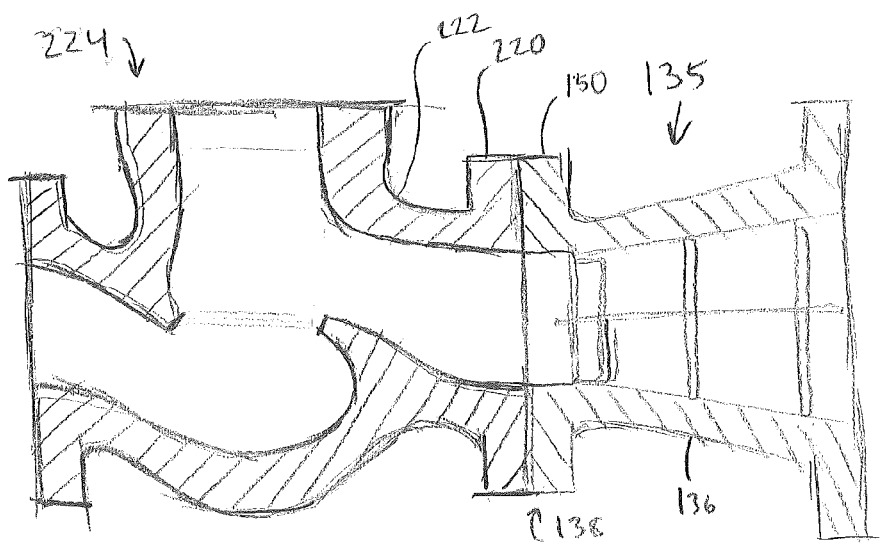
FIG. 5 is a partial cross-sectional view of an embodiment of a valve having a diffuser assembly secured thereto.

The diffuser assembly 135 is also capable of being a stand-alone accessory. That is, the diffuser assembly 135 may be secured to any suitable outlet (e.g., an outlet flange) of any type of known control valve to reduce sound in the fluid exiting the outlet of the control valve. As an example, as illustrated in FIG. 5, the first flange portion 150 disposed at the first end 138 of the diffuser housing 136 may be secured to a flange portion 220 of an outlet of a valve body 222 of a control valve 224. The flange portion 220 may be annular and planar and may include a plurality of apertures. The flange portion 220 may be adapted to be coupled to the first flange portion 150 of the diffuser assembly 135 in the same manner that the first flange portion 150 is coupled to the second flange portion 134 of the outlet member 112.

While various embodiments have been described above, this disclosure is not intended to be limited thereto. Variations can be made to the disclosed embodiments that are still within the scope of the appended claims.

What is claimed is:

1. A sound treatment assembly for use in a fluid transmission line, the sound treatment assembly comprising:
   an outlet member extending along a longitudinal axis from an open first end to a longitudinally opposite open second end, and an outlet bore extending from the first end to the second end, the outlet member having a first flange portion disposed at the first end, the first flange portion being adapted to be coupled to portion of a valve body of a regulator valve, wherein the first flange portion includes a contoured mating surface adapted to mate with a corresponding contoured portion of an exterior surface of the valve body, the outlet member having a second flange portion disposed at the second end;
   a diffuser assembly comprising:
   a diffuser housing coupled to and not integrally formed with the outlet member, the diffuser housing extending along a longitudinal axis from an open first end to a longitudinally opposite open second end, the diffuser housing having a bore extending from the first end to the second end, the bore including a first portion that extends from a first end to a second end, wherein the first portion diverges from the first end to the second end;
   a first flange portion disposed at the first end of the diffuser housing, the first flange portion disposed adjacent to the second flange portion of the outlet member;
   a second flange portion disposed at the second end of the diffuser housing, the second flange portion adapted to be coupled to portion of a downstream pipe; and
   one or more diffuser elements disposed within the bore.

2. The sound treatment assembly of claim 1, further comprising a diffuser stem disposed within the bore and extending along the longitudinal axis from a point at or adjacent to the first end of the first portion of the bore to a point at or adjacent to the second end of the first portion of the bore, and wherein the one or more diffuser elements are coupled to the diffuser stem.

3. The sound treatment assembly of claim 1, wherein the one or more diffuser elements include one or more first diffuser elements and one or more second diffuser elements that are different from the one or more first diffuser element.

4. The sound treatment assembly of claim 3, wherein the one more first diffuser elements includes a first sound plate that is planar and disposed normal to the longitudinal axis and that includes a plurality of perforations, wherein the first sound plate is disposed at a first longitudinal position.

5. The sound treatment assembly of claim 4, wherein the first longitudinal position is at or adjacent to the second end of the first portion of the bore or the second end of the diffuser housing.

6. The sound treatment assembly of claim 4, wherein the one more first diffuser elements includes a second sound plate that is planar and disposed normal to the longitudinal axis and that includes a plurality of perforations, wherein the first sound plate is disposed at a second longitudinal position that is longitudinally offset from the first longitudinal position.

7. The sound treatment assembly of claim 6, wherein the first sound plate has a perimeter edge that corresponds to a shape of a cross-section of the bore at the first longitudinal position and the second sound plate has a perimeter edge that corresponds to a shape of a cross-section of the bore at the second longitudinal position.

8. The sound treatment assembly of claim 7, wherein a perimeter edge of each of the first sound plate and the second sound plate engages or is immediately adjacent to a portion of an interior bore surface defining the bore.

9. The sound treatment assembly of claim 3, wherein the one more second diffuser elements includes a retainer assembly having a retainer interior, and wherein a diffusing material is disposed in the retainer interior.

10. The sound treatment assembly of claim 9, wherein a planar first end wall, a planar second end wall, and a cylindrical outer wall cooperate to define the retainer interior.

11. The sound treatment assembly of claim 9, wherein the retainer assembly is disposed at or adjacent to the first end of the first portion of the bore.

12. The sound treatment assembly of claim 9, wherein diffusing material comprises a plurality of springs, nuts, or bolts.

13. The sound treatment assembly of claim 9, wherein the first portion of the bore has a circular cross-sectional shape.

14. The sound treatment assembly of claim 1, wherein the second end of the first portion of the bore is at or adjacent to the second end of the diffuser housing.

* * * * *

UNITED STATES PATENT AND TRADEMARK OFFICE
CERTIFICATE OF CORRECTION

| | | |
|---|---|---|
| PATENT NO. | : 9,587,765 B2 | Page 1 of 1 |
| APPLICATION NO. | : 14/692544 | |
| DATED | : March 7, 2017 | |
| INVENTOR(S) | : Chun Lin et al. | |

It is certified that error appears in the above-identified patent and that said Letters Patent is hereby corrected as shown below:

In the Specification

At Column 2, Line 20, "know" should be -- known --.

Figure 1:
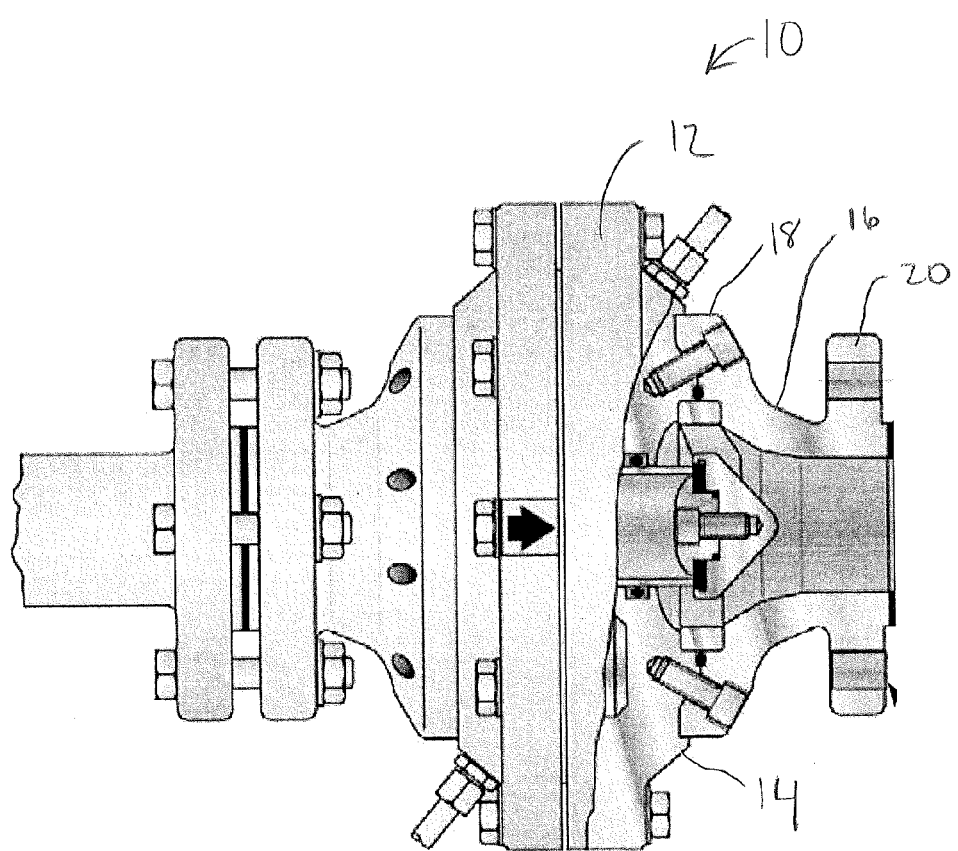
FIG. 1 is a partial cross-sectional view of an embodiment of a know pressure regulator valve having an outlet member.
Figure 2:
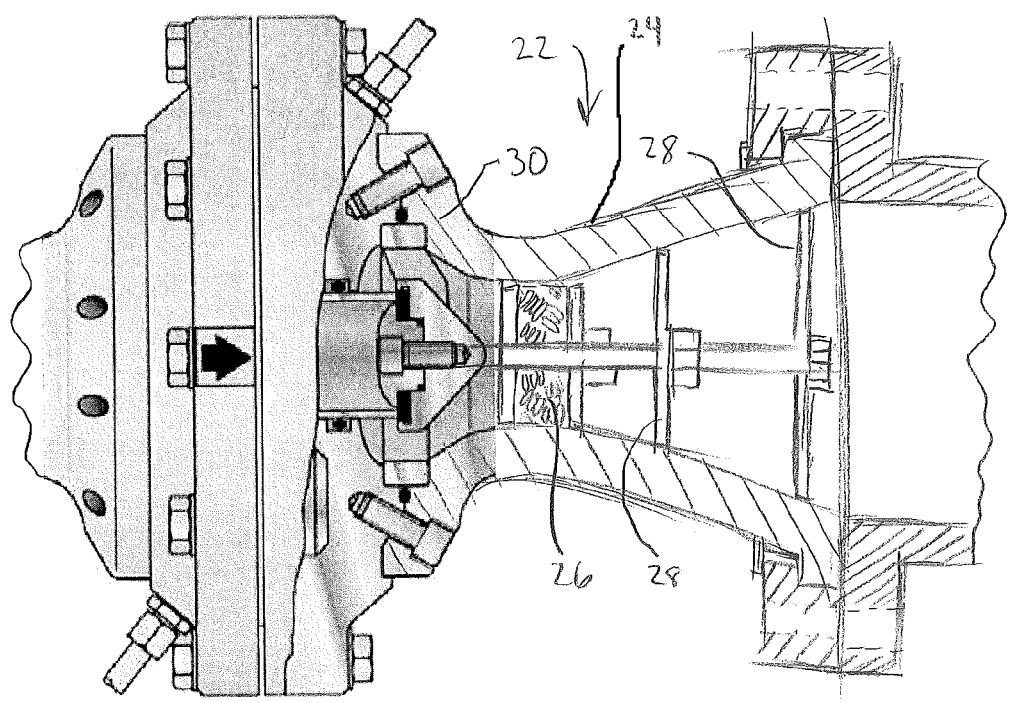
FIG. 2 is a partial cross-sectional view of the embodiment of the known pressure regulator of FIG. 1 valve having the outlet member removed and replaced with a sound treatment device.

At Column 2, Line 22, "regulator of FIG. 1 valve" should be -- regulator valve of FIG. 1 --.

At Column 4, Line 31, "diffuser housing 138." should be -- diffuser housing 136. --.

At Column 5, Line 63, "first sound plate" should be -- second sound plate 196b --.

At Column 6, Line 61, "retainer assembly 200" should be -- retainer assembly 204 --.

At Column 7, Line 61, "retainer interior 215." should be -- retainer interior 216. --.

In the Claims

At Column 9, Line 23, "first sound plate" should be -- second sound plate --.

Signed and Sealed this
Thirtieth Day of January, 2018

Joseph Matal
*Performing the Functions and Duties of the
Under Secretary of Commerce for Intellectual Property and
Director of the United States Patent and Trademark Office*